United States Patent Office 2,790,360
Patented Apr. 30, 1957

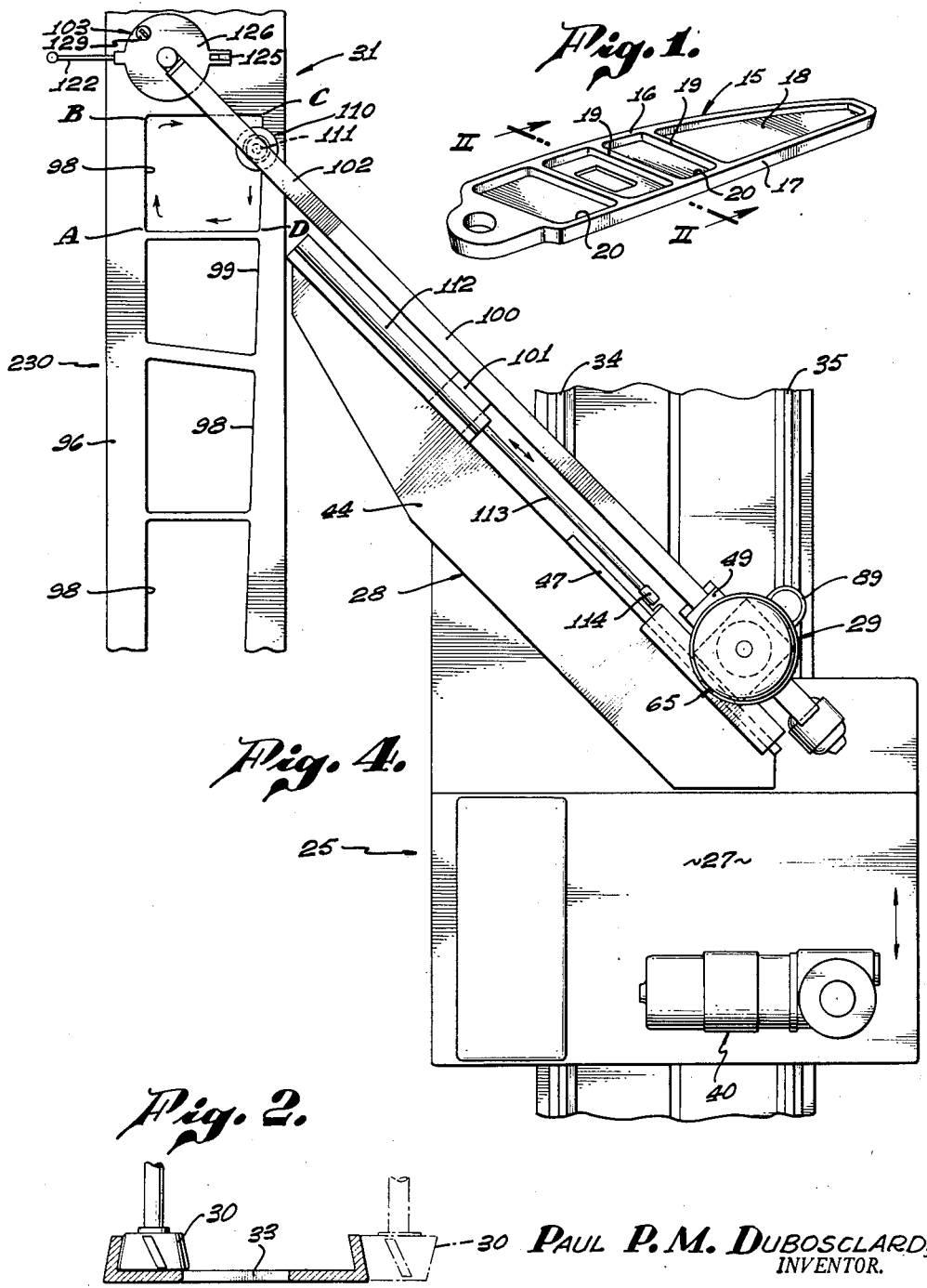

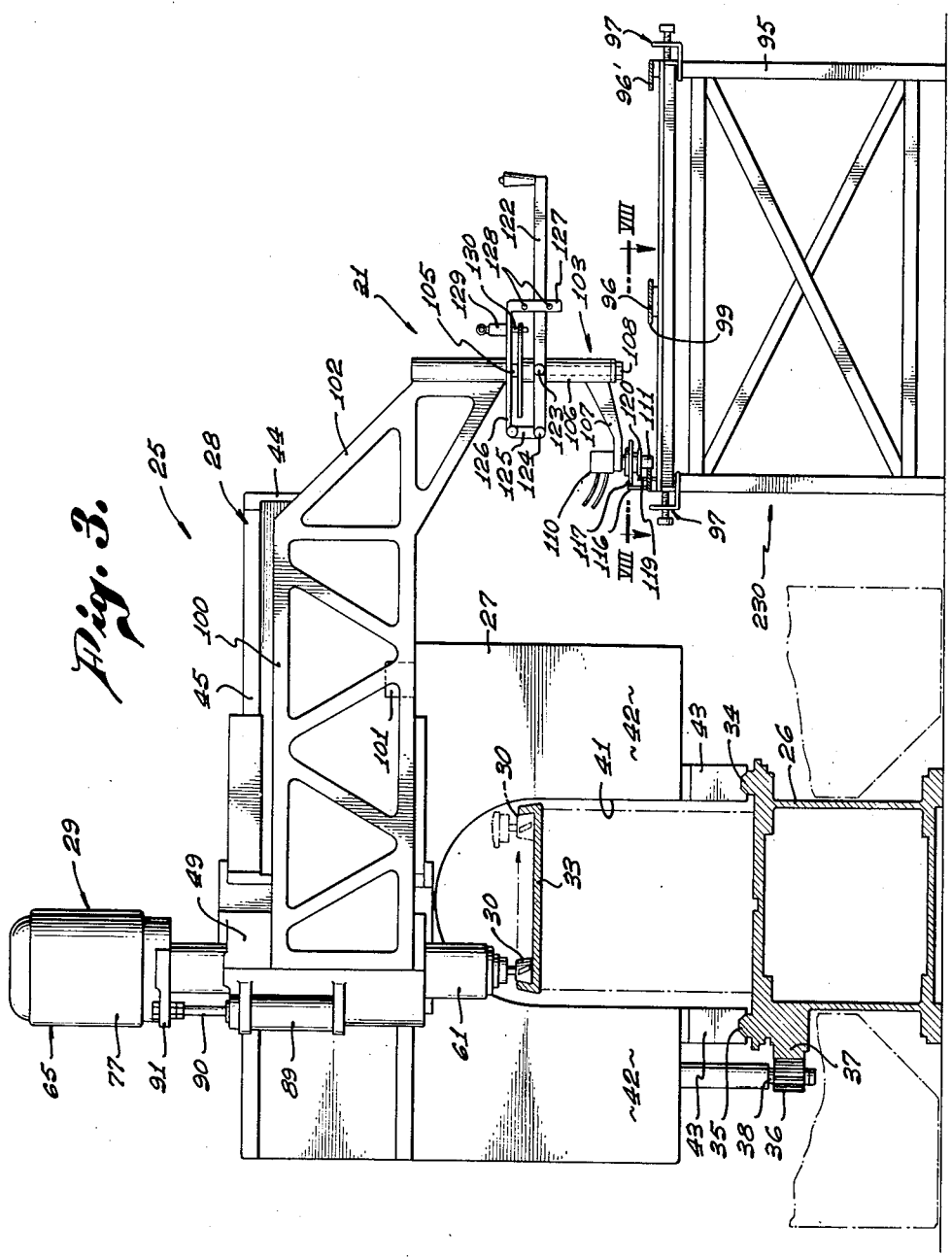

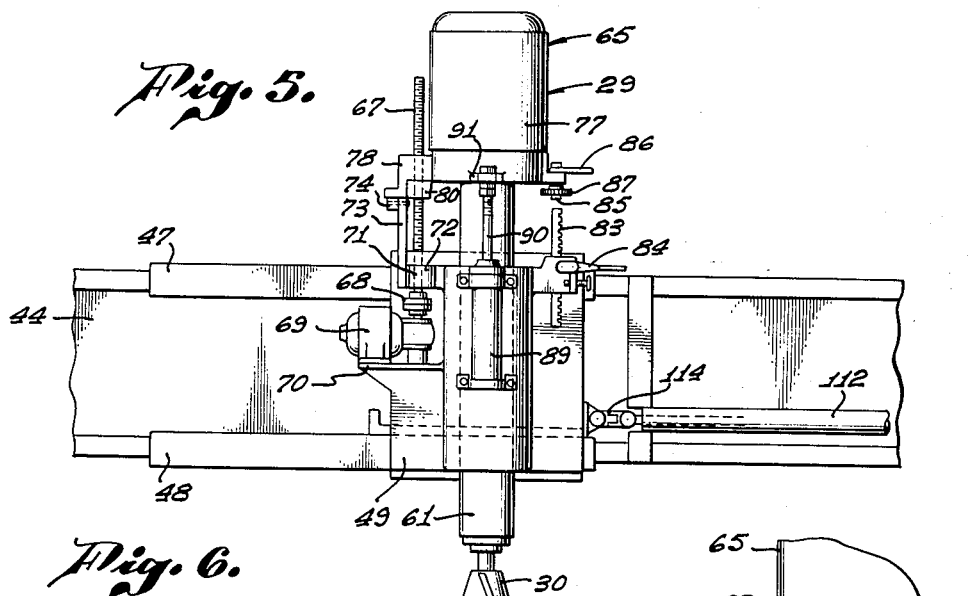
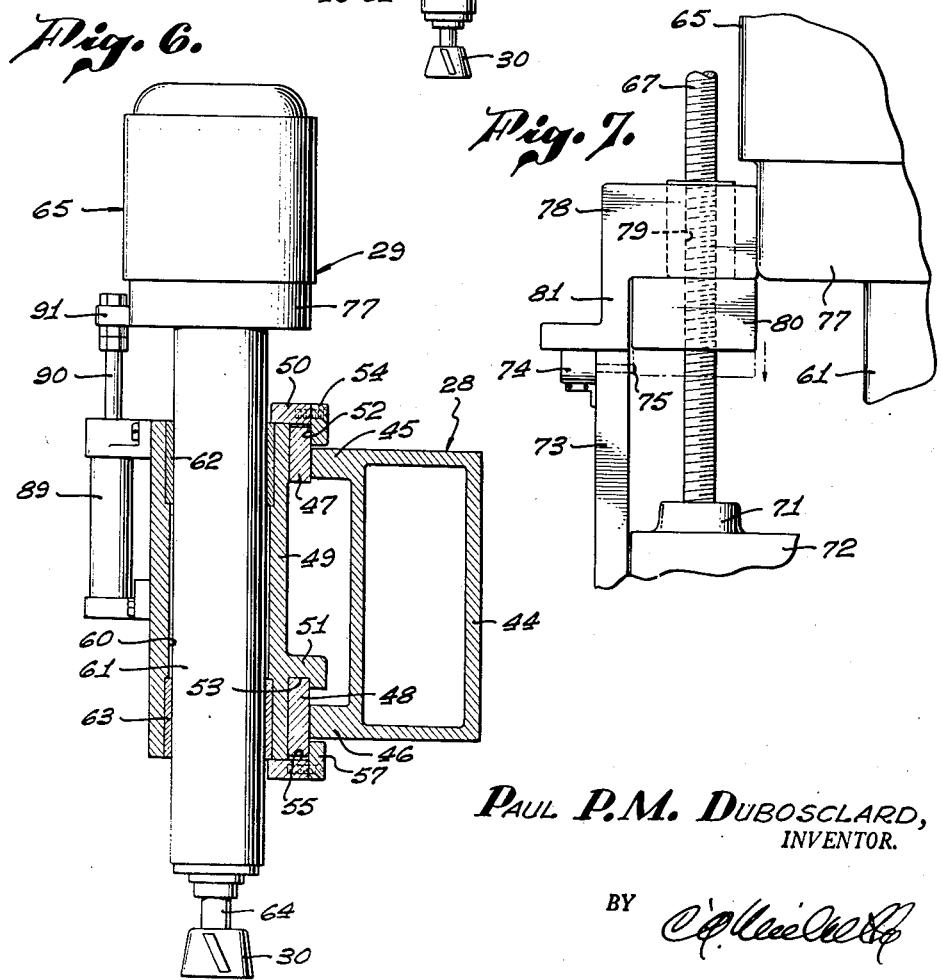

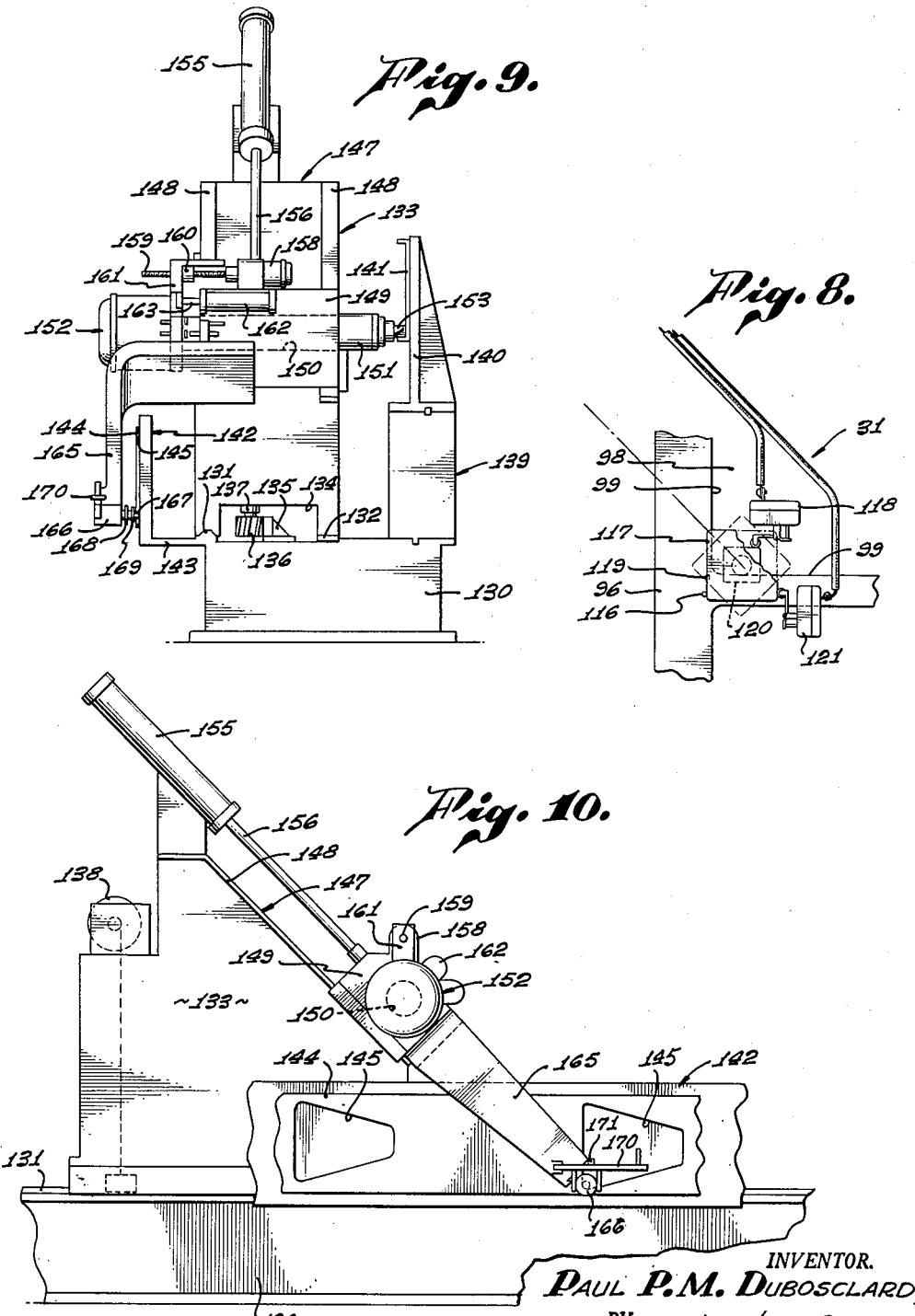

2,790,360

MILLING MACHINE

Paul P. M. Dubosclard, Topanga, Calif.

Application May 10, 1954, Serial No. 428,503

20 Claims. (Cl. 90—13.5)

This invention relates to an improved milling machine and more particularly to a carriage for a milling machine to facilitate machining of polygonal cavities in a work piece such as an integral spar used in aircraft wing construction.

In order to meet the requirements of new aircraft design, aircraft manufacturers have proposed the manufacture of integrated components of an aircraft structure. By integrated components is meant the substitution of one integral part for an assembly of a large number of small parts. The manufacture of such integrated components is extremely desirable in order to achieve maximum weight reduction in the aircraft structure per se and to accurately produce a desired aerodynamic design. The manufacture of one integral member for a presently constructed wing spar assembly not only reduces time required for production of a wing spar, but also reduces to a minimum pyramiding of errors which adversely affect aerodynamic design.

The present invention contemplates a milling machine for accurately and rapidly machining polygonal cavities in a work piece and particularly for use in the production of an integral wing spar which combines into one piece the prior assembly of two spar caps, the web extending between said caps, and stiffening ribs for said web.

The primary object of this invention is to disclose and provide a milling machine capable of machining cavities of different size, configuration and depth in an integral work piece for producing an integral wing spar.

An object of this invention is to disclose and provide a milling machine capable of finish machining cavities in an integral work piece.

Another object of this invention is to disclose and provide a milling machine having a carriage arranged to move along the longitudinal axis of a work piece while a milling cutter is transversely movable with respect to said axis and along a path at an angle thereto.

A further object of this invention is to disclose and provide a milling machine wherein means are provided for automatically reversing the direction of advancement of a carriage carrying a milling cutter.

A still further object of this invention is to disclose and provide a milling machine wherein means are provided for facilitating milling of cavities in a work piece, the cavities having different levels.

Still another object of this invention is to disclose and provide a milling machine wherein a cutter is movable in angular relationship to the longitudinal axis of movement of a carriage, traversing movement of said cutter being correlated to the rate of advancement of the carriage.

Generally speaking, this invention contemplates a milling machine for milling polygonal cavities in an integral wing spar wherein a carriage is longitudinally movable along a bed which supports a work piece from which a spar is to be made. The carriage supports a cross-slide means which provides way means extending forwardly at an angle of 45° to the axis of the bed. A vertically movable milling head is slidably supported on the cross-slide way means for movement therealong transversely and angularly of the work piece. The milling head is connected to a tracing arm arranged parallel to the cross-slide way means and extending over a selected template carried by a template-holding means positioned adjacent the machine bed. A tracing means is mounted on the end of said tracing arm for tracing engagement with the template. The tracing is cooperably associated with the milling head and the carriage whereby the direction of longitudinal and transverse movement of the milling head is controlled so as to accurately guide the milling cutter to produce a cavity of selected configuration in the work piece.

Other objects and advantages of this invention will be readily apparent from the following description of the drawings wherein an exemplary embodiment of this invention is shown.

In the drawings:

Fig. 1 is a perspective view of a wing spar which may be produced by a milling machine of this invention.

Fig. 2 is a transverse, sectional view of said spar taken in the plane indicated by line II—II of Fig. 1.

Fig. 3 is a front view of a carriage embodying this invention, the machine bed being shown in section. Fig. 3 also shows template-holding means along side said bed.

Fig. 4 is a top view of the carriage and template means shown in Fig. 3.

Fig. 5 is an enlarged, fragmentary, front view of a milling head supported by the carriage shown in Fig. 3.

Fig. 6 is a sectional view of the milling head taken in a vertical plane passing through the axis thereof.

Fig. 7 is an enlarged, fragmentary view of limit means for controlling downward movement of the milling head.

Fig. 8 is a fragmentary view of the template and template tracing means taken from the plane indicated by line VIII—VIII of Fig. 3.

Fig. 9 is an end view of a milling machine embodying a modification of this invention.

Fig. 10 is a fragmentary side view of the milling machine shown in Fig. 9, the view taken from the left of Fig. 9.

In Fig. 1 an exemplary integral wing spar member 15 of a construction machined by a milling machine of this invention is illustrated and comprises top and bottom spar caps 16 and 17 joined by a web 18 extending for the entire length of the spar member. A plurality of longitudinally spaced transverse reinforcing ribs 19 extend between the spar caps and form therewith generally polygonal cavities 20 of selected size and shape. The outer faces of spar caps 16 and 17 provide surfaces to which a metal wing skin may be attached. Preferably the outer and inner faces of each spar cap lie in parallel planes to facilitate riveting of the wing skin to the spar member. The parallel planes of the outer and inner faces of each spar cap may lie at an angle to the plane of web 18 of the spar member and such angle may vary throughout the entire length of the spar member.

In general, the milling machine of this invention, generally indicated at 25, may comprise a work piece support or bed 26 of any suitable length, a carriage means 27 mounted on said work piece support for longitudinal movement therealong, forwardly and angularly directed cross slide means 28 carried by the carriage means, a vertically arranged milling head 29 slidably mounted on the cross slide means 28 and adapted to carry a milling cutting tool 30. Extending along side the work piece support may be provided template means, generally indicated at 230, and cooperable with said template means is a tracing means, generally indicated at 31.

The elongated work piece support 26 may be of well-known form arranged to support a work piece 33 from which an exemplary spar member 15 is to be machined. The work piece 33 may be rigidly secured to the work piece support in suitable well-known manner. The support includes a pair of laterally spaced parallel ways 34 and 35 for slidably supporting carriage 27 thereon for movement of the carriage longitudinally along the work piece support and work piece.

The carriage 27 may be provided with a downwardly facing longitudinally extending opening 41 adapted to receive work piece 33 and defined by spaced downwardly directed side members 42. Way engaging members 43 may be carried by the lower portion of each side member 42.

Means for moving the carriage 27 and the cutting tool 30 longitudinally of the work piece support includes a pinion gear 36 rotatable about a vertical axis at one side of the work piece support and enmeshed with teeth of a longitudinal rack bar 37 carried by the work piece support. Means for driving the pinion gear 36 includes a vertical shaft 38 which extends upwardly to suitable gear means which are driven by a motor means 40. The motor means 40 may be carried on top of carriage 27 and is reversible so that carriage 27 may be driven in either longitudinal direction along the work piece support.

Means for moving the milling cutting tool 30 angularly with respect to the longitudinal axis of the work piece support may comprise the angularly and forwardly directed cross slide means 28 which may be rigidly fixed to the front portion of the carriage 27 in any suitable well-known manner. The cross slide means 28 includes a structural member 44 of any suitable section illustrated in Fig. 6 as of box section. The member 44 extends horizontally and at an angle of approximately 45° to the longitudinal axis of the work piece support. The member 44 may be provided with top and bottom parallel front flanges 45 and 46 respectively having secured thereto, as by welding, top and bottom rails 47 and 48 extending longitudinally of member 44 and above the work piece support. The rails 47 and 48 project above the flanges 45 and 46 and afford cross slide way means for slidably supporting a block 49. The rail 48 may extend below flange 46 as shown.

The slidable block 49 may include rearwardly extending top and bottom guide shoes 50 and 51 forming parallel guide grooves 52 and 53 adapted to slidably receive upper edge portions of rails 47 and 48. The bottom guide shoe 51 may be integrally formed with the block while the top guide shoe 50 may include a detachably secured guide element 54 to facilitate assembly and disassembly of the block from the rail 47.

The portion of the lower rail 48 extending slightly below flange 46 is adapted to be received within an upwardly facing guide groove 55 provided on the bottom guide shoe 51. The groove 55 may be formed by a longitudinal element 57 releasably secured to the lower portion of guide shoe 51 to facilitate assembly and disassembly of sliding block 49 with the rails.

The milling head 29 is mounted for adjustable vertical movement in sliding block 49. A vertically extending bore 60 formed in block 49 slidably receives an elongated tubular housing 61, said bore 60 being provided with top and bottom internal bearing means 62 and 63. The tubular housing 61 encloses a vertical drive shaft 64, the lower end of which carries the milling cutting tool 30. The upper end of shaft 64 is coupled to the motor shaft of a motor means 65 of the milling head for rotating at selected speed the milling cutting tool 30.

Means for vertical adjustment and positioning of the milling cutting tool 30 carried by the milling head may comprise a vertically arranged screw feed including a vertically disposed threaded shaft 67 having its axis parallel to the axis of milling head 29. The threaded shaft 67 may be driven through a coupling means 68 by a motor means 69 carried on a suitable sidewardly extending horizontal platform 70 provided on the sliding block 49. The shaft 67 may be supported in bearing means 71 carried by a sidewardly extending portion 72 of the sliding block 49. The outer face of the portion 72 may adjustably carry an upstanding member 73 which carries a limit switch 74 adjacent its top having contact element 75 extending toward the shaft 67. The member 73 and limit switch means 74 may serve to limit downward movement of the milling head as later described.

The housing 77 of the motor means 65 may carry a sidewardly extending bracket 78 having a sleeved bore 79 therein for sliding engagement with the shaft 67. Below the bracket 78 a loose square nut 80 may be threaded on shaft 67, said nut being held against rotation by abutment of one edge face against a depending sidewardly directed angle portion 81 of the bracket 78. The bottom face of portion 81 is adapted to contact the top of member 73 at the downward limit of movement of the milling head. The threaded nut, held against rotation serves to drive the milling head upwardly when shaft 67 is rotated. On downward movement of the milling head, the nut travels down the shaft and the milling head follows by gravity.

Means for facilitating positioning of a micrometric limiting stop for downward movement of the milling head 29 may comprise a vertically movable rack bar 83 carried by the sliding block on the side opposite to the shaft 67. The rack bar may be moved vertically by a suitable jack arm 84 carrying at its inner end teeth (not shown) for engagement with the bar 83. The top face of bar 83 is contacted by a depending element 85 which is adjustably vertically moved by a handle 86 through micrometer means 87 for accurately precisely determining the limit of downward movement of the vertical milling head 29.

When the milling head is moved downward by the rotation of the screw shaft 67, abutment of the element 85 with the top of bar 83 will cause downward movement of the milling head to stop. Member 73 is vertically adjusted so that limit switch means 74 is positioned with its element 75 just below the selected downward limit of movement of the milling head. The motor means 69 will then be stopped by reason of the nut 80 on the shaft 67 travelling downwardly in slidable contact with portion 81 and member 73 until it contacts the limit switch element 75 which then causes opening of the electrical circuit controlling operation of the motor 69.

Means for quickly raising the milling head 29 at the end of a cut and to assist lowering of the milling head when piercing virgin metal may comprise a double-acting air cylinder means 89 carried by the sliding block 49 at the front thereof. The air cylinder means 89 includes a reciprocal piston means having piston rod 90 extending upwardly and secured to a lug 91 forwardly extending from the milling head. The air cylinder means 89 is actuated by a control means adjacent the template means as later described so as to cause immediate lifting of the milling head when desired.

The template means 230 comprises a suitable table 95 (Fig. 3) which extends parallel to and adjacent the work piece support. A selected template 96 is carried on top of and along the inner portion of the table 95 and may be accurately positioned thereon by template adjusting means 97 provided along opposite sides of the table. The exemplary template means 96 (Fig. 4) may comprise a plurality of longitudinally spaced polygonal openings 98 of preselected shape and configuration. The polygonal openings 98 are defined by template edge faces 99 spaced slightly above the body of template 96 to facilitate positive engagement of the tracing means 31 therewith.

The tracing means 31 for causing movement of the milling head and carriage in accordance with the pattern of template 96 includes a sidewardly and forwardly extending tracing arm 100 illustrated as being of truss construction, rigidly fixed at its inner end to sliding block 49. The arm 100 lies parallel to the cross slide member 44 and may be further supported therefrom as by a shoe 101 on the member 44. The arm 100 extends beyond the side of carriage 27 and terminates in a downwardly extending portion 102 which carries at its extremity a swivel mounted tracing assembly 103. The purpose of the swivel mounting is to facilitate positioning of the tracing assembly 103 over one template 96 in one position and over an adjacent different template 96' in a diametrically opposite position in instances when the cavity to be milled includes different vertically spaced levels.

The swivel assembly 103 may comprise a depending shaft 105 upon which is rotatably mounted a tubular sleeve 106 which carries a horizontally extending arm 107. The sleeve 106 may be secured to the shaft 105 by a nut 108.

At the extremity of arm 107 may be carried a tracing valve means 110 which is actuated in well-known manner by a depending tracer stylus 111 which is adapted to engage and follow the edge 99 of the template 96. The tracer valve means 110 may be hydraulically connected to a hydraulic cylinder and piston means 112 carried by the cross slide member 44 in parallel longitudinal relation between member 44 and tracing arm 100. The piston 113 of the cylinder and piston means 112 may be connected as at 114 to the sliding block 49. Response of the tracing stylus 111 to the configuration of the template is transmitted through the tracing valve means 110 to the hydraulic cylinder and piston means 112 for moving the sliding block 49 and milling head 65 in traversing movement along the rails 47 and 48 on the cross slide means 28.

Since the milling machine of this invention is designed to operate at high speeds, the tracing assembly 103 includes means for slowing down and then reversing the direction of movement of the carriage along the work support. Such means may comprise a first pin 116 fixed to the template adjacent a corner of the template cavity, said pin 116 being adapted to be contacted by a plate 117 of suitable shape, such as square, pivotally carried by the stylus 111. The plate 117 upon contact with the pin 116 rotates due to advancement of the stylus towards the pin 117 into a position for contacting a switch means 118. Switch means 118 is electrically connected to the longitudinal drive motor 40 for causing the motor 40 to slow down and thus cause slowing down of movement of the carriage.

Means for reversing direction of the carriage at said template corner may comprise a second upstanding pin 119 for cooperable engagement with a similarly arranged rotatable plate 120 located below plate 117. The rotation of plate 120 upon contact with the pin 119 urges the plate against a switch means 121 which is electrically connected to motor 40 to cause reversal of the motor drive and to thereby reverse the direction of movement of the carriage.

The means for raising the tracer assembly 103 and disengaging the stylus 111 from template 96 may comprise a lever 122 pivotally connected to the sleeve 106 as at 123. One end of lever 122 may be pivotally connected as at 124 to a link 125 pivotally carried by a horizontal member 126 secured to the end of the tracing arm portion 102. The member 126 carries an outer depending member 127 provided with vertically spaced transversely extending pins 128 which serve to limit movement of lever 122 which passes therebetween. A switch means 129 may be carried by member 126 and is provided with a depending switch contact element 130 adapted to be engaged when the lever 122 is lifted for raising the stylus from engagement with the template. The switch means 129 is electrically connected to valve means for controlling actuation of the air cylinder means 89 and the motor 69 for raising the milling head 29 and thereby lifting the cutting tool 30 out of contact with the work piece.

It is understood that a work piece from which an integral spar is to be made may be machined in several phases. The major portion of the material in the cavities at the sides of the spar member and finishing machining of the sides may be milled by spar milling machines well known in the art. The operation of the milling machine of this invention contemplates finish machining of the cavities roughly provided by such prior machines and it is understood that most of the metal has been already removed.

In operation of the milling machine of this invention it is understood that the template 96 is properly and accurately adjusted with respect to the work piece fixed to the work piece support. The tracer valve and stylus is positioned within a template cavity and upon starting tracer action, the stylus is moved to a suitable starting point such as a corner A (Fig. 4). This initial tracer action positions cutting tool 30 over the work piece at a corresponding corner of a cavity to be milled.

An operator starts cutting of the metal of the work piece by first lowering cutting tool 30 so that it may penetrate the metal to a preselected depth, the depth of cut being controlled by the micrometric stop 85. Lowering of the milling head is controlled by rotation of the feed screw 67 by the motor means 69. The nut 80 travels downwardly on the screw 67 permitting the vertical milling head and cutting tool to move downwardly by gravity until the micrometric stop is contacted. The nut 80 continues downwardly for a very short distance until it contacts switch element 75 which causes the motor means 69 to stop. If desired, downward movement of the vertical milling head may be assisted by air cylinder means 89 so as to provide necessary effort or force to the cutting tool to penetrate the metal. It should be noted that the speed of feeding movement of the milling head is regulated by the screw feed, but when gravity forces are insufficient (or when a horizontally disposed milling head is employed as in the succeeding embodiment), the air cylinder means may be employed to assist movement of the cutter. The screw feed on the milling head regulates the cutter feed when piercing virgin metal and is highly necessary to prevent jamming of the cutter, as when speed of cutter feed is not controlled or regulated.

After the cutting tool has reached selected depth in the metal of the work piece, the carriage longitudinal drive motor 40 is started and stylus 111 of the tracing means begins to follow the template edge 99. Upon starting the carriage feed and tracing action, the stylus will be advanced forwardly, for example, at a selected rate of speed along edge A—B, of template 96. Point B is indicated at a corner longitudinally adjacent to corner A. While the stylus moves along edge A—B, the cutting tool 30 will remove metal from the work piece along a line in the same direction. It will be apparent that because of the angular relation of the tracing arm with respect to the direction of movement of the stylus and cutting tool that the stylus will bear against edge face 98 of the template with predetermined contact pressure.

When stylus 111 reaches the corner B, it will begin to move transversely of the longitudinal direction of movement and toward the adjacent corner C on the opposite side of the template cavity. While the tool is cutting transversely of the work piece as between corners B and C, longitudinal advancement of the carriage will remain at substantially the same rate of speed. During the movement of the stylus along the edge B—C, the cutting speed is maintained approximately constant by providing transversing movement of the sliding block 49 at a speed in the order of speed of advancement of the carriage multiplied by the square root of 2 (the cavity being substantially rectangular). It will be apparent that increase in traversing speed of the cutting tool will permit cutting of the cavity between corners A, B and C while the carriage moves in one longitudinal direction. This increase in traversing speed is automatically provided by the tracing means because a variation in speed of advancement of the carriage will vary the pressure contact of the stylus against the template along the edge B—C. Such variation in pressure will cause the tracing valve means to modify the flow of fluid to cylinder 112 in response thereto, and thus cause the sliding block to respond at the desired speed along the cross slide means.

Since this milling machine is designed to operate at high speeds, as the stylus approaches corner C, the plate 117 contacts pin 116 which causes the plate 117 to rotate and actuate a switch means 118 which is electrically connected to the carriage longitudinal drive motor. Actuation of this switch means causes the carriage speed to be reduced. At reduced speed, the stylus is then further advanced toward corner C until plate 120 contacts pin 119, said pin causing rotation of plate 120 so that it may contact a second switch means 121 for reversing the direction of the carriage drive motor. Since the advancement of the carriage forwardly has been reduced by actuation of the first switch means, the carriage will be stopped and commence movement in a reverse direction without overtravel of the cutting tool.

The carriage means and the milling cutting tool travel in an opposite longitudinal direction and the stylus moves along the edges C—D and D—A. Movement along the edge C—D is substantially the same as that described for movement of the stylus along the edge A—B. Traversing movement of the stylus along the edge D—A is accomplished in the same manner as traversing movement along the edge B—C, the speed of traversing movement being in the order of the square root of 2 times the speed of movement of the carriage means.

As the stylus approaches the corner A, the operator prepares to stop longitudinal movement of the carriage means and to raise the milling head and the cutting tool from the work piece. When the stylus reaches corner A, the carriage feed is automatically stopped when the operator lifts lever 122. At the same time lifting of lever 122 causes the air cylinder means 89 to raise the head. After the cutting tool has been raised from the cavity, the carriage means may be longitudinally advanced and the cutting tool lowered for commencement of cutting of an adjacent cavity in the work piece.

In the event the cavity to be cut includes different contours at different levels of metal, the operator may readily change to such different levels by rotating the tracer arm 107 about its swivel mounting 106 so that the stylus 111 may contact and be responsive to the template edge on the adjacent template means 96′. The cooperable relation of the stylus 111, cutting tool 30 and tracing valve means 110 with respect to the template 96′ is the same as that described for the template 96.

In Figs. 9 and 10 is shown a different modification of this invention wherein a work piece is held in a vertical plane, a template is held in a spaced vertical plane, and a carriage is movable between the spaced planes of the workpiece and the template. Also in this modification, the milling cutter is rotatable about a horizontal axis and cross-slide means is arranged for movement in a plane inclined to the horizontal at approximately 45°. The operation and control means of the milling machine of this modification are substantially the same as the prior embodiment and only differences in construction will be described in detail.

In this modification a bed 130 may be provided with spaced parallel way means 131 and 132 for movement of a carriage means 133 longitudinally along the bed. The carriage means 133 may be provided with a downwardly facing longitudinal opening 134 within which may be received a longitudinally extending rack 135 carried by the bed and engaged by a pinion gear 136 rotatable about a vertical axis. The pinion gear may be connected by a vertical shaft 137 to a reversible longitudinal drive motor 138 mounted on platform provided therefor on the rear of the carriage 133.

Extending along one longitudinal side of bed 130 may be a work piece support means 139, said work-support means having a top removable work-support member 140 for carrying a work piece 141. The work-support member 140 may be provided with a vertical planar surface facing the carriage means 133 upon which the work piece 141 may be supported in any suitable well-known manner.

Along the opposite longitudinal side of bed 130 may be provided a template support means 142 which may also be disposed in a vertical plane parallel to and spaced from the plane of the work 141. Suitable horizontal members 143 may be provided for supporting the template means 142 in spaced relation to the side of bed 130 for providing suitable clearance for the carriage means 133. The template means 142 may carry on its outer face a suitably selected template 144 disposed in a vertical plane and secured thereto in any well-known manner. The template 144 is provided with a template edge 145 having a desired contour for a cavity to be milled in the work piece.

The carriage means 133 is provided with a forwardly and downwardly inclined cross-slide means 147 which may include parallel longitudinal ways 48 inclined at an angle approximately 45° to a horizontal plane. A sleeve-block means 149 may be slidably mounted on the cross-slide means 147 for movement therealong. The sleeve block 149 is provided with a horizontal transverse bore 150 in which may be slidably mounted for horizontal axial movement a tubular member 151 of a horizontal milling head 152. The tubular member 151 carries at its extremity a milling cutter 153 for rotatable cutting engagement with work piece 141.

Means for slidably moving the sleeve block 149 along the cross-slide means 147 may include a forwardly and downwardly inclined double-acting hydraulic cylinder means 155 carried at the top of carriage 133. The cylinder means 155 is provided with a piston rod 156 at its free end to the sleeve block 149.

Means for moving the cutter 153 horizontally may comprise means similar in construction and operative to that disclosed in the prior modification. Attached to sleeve block 149 may be a horizontal milling head feed motor 158 having a screw feed shaft 159 provided with a loose travelling nut 160 which may engage a bracket 161 carried by the milling head 152. Also attached to the sleeve block 149 may be a double-acting air cylinder means 162 provided with a piston rod 163 connected to the bracket 161 attached to the milling head 152. The air cylinder means 162 and screw feed 159 driven by motor 158 serves to horizontally adjust the milling cutter with respect to the vertically disposed work piece, the operation and control thereof being virtually the same as that described for adjustment of milling head 29 of the previous embodiment.

Tracing means is arranged similarly to that described in the prior embodiment and may include a downwardly extending tracer arm 165 carried by the forward face of sleeve block 149 and extending to and disposed on the outer side of the template means 142. The tracing arm 165 may carry at its end a tracer valve 166 having a tracer pin 167 for cooperable responsive engagement with the contour edge 145 of a template 144. If desired, polygonal plates 168 and 169 may be provided to automatically control movement of the tracer pin 167 along two contiguous edges of the template 144 while the carriage is moving in one direction as described in the prior embodiment. The tracer arm 165 may carry a retracting lever 170 which is cooperably associated with a limit switch means 171 for moving the cutting tool out of contact with the work piece all as described in detail in the prior embodiment.

It will be readily apparent in this modification that the horizontally disposed cutter 153 may move along a work piece 141 in the direction of travel of the carriage and while the carriage is advancing at a selected rate of speed may also move in a vertical direction to cut to the contour of at least two contiguous angularly disposed sides of a polygonal opening as determined by the template 141. After two contiguous sides of such an opening have thus been cut, the operator must reverse the longitudinal drive motor by operation of the retracting lever 170 as in the prior embodiment and the remaining two contiguous sides of a spar opening may be cut in similar manner.

It will be understood that this invention contemplates a milling machine for cutting a cavity in a spar or other work piece wherein the carriage means is movable along a selected path, a cutter means is movable along a path lying in a plane perpendicular to the direction of movement of the carriage means, and the cutter is also movable along a path lying in a plane at an angle to the path of the carriage means. It is understood of course that for the purposes of this modification the template may be mounted in different manner. In each embodiment shown, the carriage means is provided with cross slide means for advancing a cutter at an angle to the direction of movement of the carriage means.

The milling machine of this invention thus provides a novel carriage means for finish machining of cavities in a work piece which includes cross-slide means for the milling head arranged at an angle to the longitudinal direction of movement of the carriage and whereby two contiguous faces of the cavity may be machined while the carriage moves in one direction. It is important to note that the carriage feed is automatically stopped and reversed and that over travel of the cutting tool is positively prevented. Template changes are minimized by the particular arrangement of a swivel mounted tracing arm which can be readily engaged with a different template.

All changes and modifications coming within the scope of the appended claims are embraced thereby.

I claim:

1. In a machine for milling cavities in a work piece, the combination of: a work piece support; a carriage movable along said work piece support; cross-slide means on the carriage including ways arranged at an angle to the direction of movement of the carriage along the support; a block slidable on said ways; a milling head carried by said block and provided with a vertically adjustable milling cutter; means carried by said cross-slide means and connected to said block for moving said block; means for moving said carriage; template means adjacent said work piece support; and single tracing means on the cross-slide means cooperable with said template means and controlling said carriage-moving means and said block-moving means for causing traversing movement of the block during movement of the carriage to move the cutter at virtually constant cutting speed in at least two directions.

2. A machine as stated in claim 1 including means on the template means cooperable with said tracing means for reversing the direction of movement of the carriage.

3. In a milling machine for machining substantially rectangular cavities in a work piece, the combination of: a work piece support; a cutting tool; means for moving said cutting tool in a direction longitudinally of the work piece; means including a forwardly and angularly directed slide means mounted on said moving means for simultaneously moving said cutting tool at an angle to the longitudinal direction of movement of the cutting tool; means for controlling the rate of movement of said cutting tool in both longitudinal and angular directions whereby two contiguous walls of the cavity may be machined at virtually constant cutting speeds in both directions during longitudinal movement of the tool in one direction; and means for reversing the direction of longitudinal movement of the tool for machining the opposite contiguous walls of the cavity during longitudinal movement of the tool in the opposite direction.

4. In a milling machine, the combination of: a work piece support for carrying a work piece in a vertical plane; a carriage movable longitudinally of the work piece support; means for driving said carriage; a horizontally disposed milling head having a milling cutter rotatable about a horizontal axis; means on said carriage for slidably supporting said milling head for movement along a path inclined to the vertical; means for moving said milling head along said axis; template means for supporting a template in a vertical plane spaced from the plane of the work piece; and tracing means carried by the slide means responsively engaging said template for controlling traversing movement of the milling head on the slide means during movement of the carriage.

5. In a milling machine for machining cavities in a work piece, the combination of: a bed; a work piece support at one side of said bed; a template support at the opposite side of said bed; a cutting tool between said work piece support and said template support; means for moving said cutting tool in a direction longitudinally of the work piece; means for moving said cutting tool towards and away from said work piece support; means for moving said cutting tool at an angle to the longitudinal direction of movement of the cutting tool; and tracing means operably associated with a template carried by the template support means and with the cutting tool.

6. In a milling machine for milling cavities in a work piece, the combination of: a bed; a carriage means movable longitudinally along said bed; a work piece support extending along one side of said bed and adapted to support a work piece in a vertical plane; a template support means carried by the bed on the other side thereof and adapted to support a template in a vertical plane spaced from the plane of the work piece support; a horizontally disposed milling head mounted on said carriage means and having a cutter rotatable about a horizontal axis and disposed adjacent to said work piece support; and means for moving said milling head along a path inclined to the vertical.

7. In a milling machine as defined in claim 6 wherein the means for moving said milling head along an inclined path includes parallel inclined way means on said carriage means.

8. In a milling machine as defined in claim 6 wherein said carriage means includes a forwardly facing downwardly inclined way means; a sleeve block slidably mounted on said inclined way means for carrying said milling head; and a tracing means extending forwardly and downwardly from said sleeve block for cooperable association with a template means.

9. A carriage for a milling machine to move longitudinally along an axis of a work piece support and including cross-slide means on the carriage provided with way means lying at an angle of 45° to said longitudinal movement of the carriage; and a milling head slidably supported and movable along said way means.

10. A carriage for a milling machine including slide means positioned obliquely to an axis of said carriage; and a milling head slidably supported on said slide means.

11. In a cavity milling machine, the combination of: a carriage; means for driving said carriage; a cross-slide means provided on the carriage and disposed in oblique relation to the path of movement of said carriage; a milling head slidable along said cross-slide means; and tracing means connected to the milling head and supported by said carriage, said tracing means including a tracing arm extending parallel to and beyond said cross-slide means, a tracing assembly mounted at the end of said arm and including a tracing stylus adapted to engage an associated template means, a switch means carried by the tracing assembly and connected to the drive means; and a polygonal plate pivotally mounted on said tracing assembly for contacting said switch means to reverse the direction of movement of said carriage.

12. In a machine as stated in claim 11 wherein said tracing assembly is pivotally mounted at the end of said tracing arm.

13. In a milling machine, the combination of: a carriage; means to move the carriage along a path at a selected constant speed; a cutting tool; means to support the tool from the carriage and to move the tool along a path oblique to the carriage path; and means for correlating movement of the tool in the oblique path and the carriage path to maintain virtually constant longitudinal and traverse cutting speeds with virtually constant speed of the carriage in one direction, said correlating means including a single tracing means cooperably connected to said tool moving means.

14. In a milling machine, the combination of: a carriage; means to move the carriage along a path at a selected constant speed; a cutting tool; means to support the tool from the carriage and to move the tool along a path oblique to the carriage path; and means for correlating movement of the tool in the oblique path and the carriage path to maintain virtually constant longitudinal and traverse cutting speeds with virtually constant speed of the carriage in one direction, said correlating means including single tracing means comprising a tracing arm extending parallel to the oblique path.

15. A milling machine as stated in claim 14 wherein means at the end of said tracing arm are operatively connected to the carriage moving means to automatically reverse the direction of movement of said carriage.

16. A milling machine as stated in claim 15 wherein said automatic reversing means on the tracing arm includes a switch means and a pivotally mounted plate, and a pin on an associated template means to cooperably engage said plate.

17. In a milling machine, the combination of: a carriage; means to drive the carriage along a path at a selected speed; a cutting tool; means to support the tool from the carriage and to move the tool along a path oblique to the carriage path, said support means including an obliquely extending cross-slide means fixed on said carriage; and a single tracing means connected to the tool moving means and carried at the extremity of said cross-slide means to correlate movement of the tool in the oblique path with movement of the tool in the carriage path.

18. In a milling machine for machining cavities in a workpiece, the combination of: a workpiece support; a carriage movable longitudinally of the workpiece support; means for driving said carriage; a milling head; slide means on said carriage slidably supporting said milling head for movement along a path at an angle to the longitudinal movement of the carriage; means on the carriage for moving said milling head; template means adjacent to the workpiece support; and a single tracing means carried by the slide means responsively engaging the template means for selectively correlating the rate of movement of the milling head on the slide means with longitudinal movement of the carriage whereby contiguous walls of a cavity being machined may be cut at virtually constant cutting speeds.

19. In a milling machine, the combination of: a workpiece support and a template support means lying in parallel relation; a carriage longitudinally movable parallel to the workpiece support; a milling head provided with a milling cutter for cutting engagement with a workpiece supported by the workpiece support; and means for mounting said milling head on said carriage for movement along a path at an angle to the longitudinal direction of movement of the carriage and including tracing means positioned at an extension of said angular path and cooperably positioned with respect to said template support means.

20. In a milling machine for machining cavities in a workpiece, the combination of: a workpiece support; a cutting tool; means for moving said cutting tool in a direction longitudinally of the workpiece; means including an angularly disposed slide mounted on said moving means for simultaneously moving said cutting tool at an angle to the longitudinal direction of movement of the cutting tool; and means for controlling the rate of movement of said cutting tool in both longitudinal and angular directions whereby contiguous walls of a cavity may be machined at virtually constant cutting speeds during longitudinal movement of the tool in one direction.

References Cited in the file of this patent

UNITED STATES PATENTS

| 2,059,505 | Wright | Nov. 3, 1936 |
| 2,341,194 | Schwartz et al. | Feb. 8, 1944 |

FOREIGN PATENTS

| 519,102 | Great Britain | Mar. 15, 1940 |
| 740,122 | France | Jan. 21, 1933 |
| 1,072,582 | France | Sept. 14, 1954 |